United States Patent [19]

Mölls et al.

[11] 4,268,972

[45] May 26, 1981

[54] THIN LAYER CONTACT DRIER

[75] Inventors: Hans-Heinz Mölls, Leverkusen; Vaclav Kaspar, Cologne; Asterios Moutsokapas, Bergisch Gladbach, all of Fed. Rep. of Germany

[73] Assignee: Bayer Aktiengesellschaft, Leverkusen, Fed. Rep. of Germany

[21] Appl. No.: 73,046

[22] Filed: Sep. 6, 1979

[30] Foreign Application Priority Data

Sep. 16, 1978 [DE] Fed. Rep. of Germany ....... 2840481

[51] Int. Cl.$^3$ .............................................. F26B 19/00
[52] U.S. Cl. ...................................... 34/60; 159/13 A
[58] Field of Search ............... 241/258, 257 R, 259.1; 34/60, 61, 12; 165/154, 89; 159/5, 1 R, 9 R, 10, 6 R, 6 W, 11 R, 11 A, 11 B, 21, 25 A, 34, 49, DIG. 11, DIG. 14, DIG. 25, 13 R, 13 A

[56] References Cited

U.S. PATENT DOCUMENTS

| | | | |
|---|---|---|---|
| 867,989 | 10/1907 | Middleton et al. | 241/258 |
| 2,581,414 | 1/1952 | Hochberg | 241/46.17 |
| 3,222,038 | 12/1965 | Ashcraft | 241/253 |
| 4,176,797 | 12/1979 | Kemp | 241/258 |

OTHER PUBLICATIONS

"Luwa–SMS Eine Neve Einheit in der Verfahrenstechnik"; 1973.

Primary Examiner—Frank Sever
Attorney, Agent, or Firm—Sprung, Felfe, Horn, Lynch & Kramer

[57] ABSTRACT

In an apparatus for drying solutions, dispersions or suspensions, distributor elements are moved by a central rotable installation between parallel planes. As the planes are not perpendicular to the axial shaft, the edges of the distributor elements touch and stroke over the whole surface of the heat exchanger. A self-cleaning effect of the inner surface of the drying apparatus is guaranteed. In a preferred embodiment the distributor elements are cylindrical.

11 Claims, 3 Drawing Figures

THIN LAYER CONTACT DRIER

BACKGROUND OF THE INVENTION

The present invention relates to an apparatus for the drying of solutions, dispersions and suspensions on a heatable internal surface containing a rotatable fitting, a feed device, a discharge device for dried product and a vapour outlet.

Thin layer apparatus are known in which rigidly fixed rotor edges on the thin layer evaporator proper are replaced by edges which are rotatably fixed to hinges. The minimum gap between the wall and the pendulous edges is 0.3 to 0.5 mm. This can be used to adjust a thin layer on the inside of a cylindrical pipe, and such a thin layer evaporator can therefore also be used as thin layer drier. Liquids which are capable of being pumped can in this way be continuously processed in a thin layer apparatus to be converted into loose pourable solid material in a single step.

Unfortunately, however, many products cannot be dried continuously in this manner because they often pass through a viscous state in the course of drying so that they stick to the internal wall and form incrustations on the elements provided for stripping the wall so that these elements cease to be sufficiently mobile and fail to function as stripping elements. The least harmful result is that a lumpy product is obtained but in most cases the drier breaks down within a short time and must be cleaned by a complicated and difficult process.

SUMMARY OF THE INVENTION

It is an object of the present invention to install a mechanism in a thin layer drier for stripping the drying surface and rendering the movable elements self-cleaning. To solve this problem, distributor elements are arranged between several parallel planes which are not perpendicular to the axis, and the elements are freely movable only between these planes and make at least partial contact with the internal surface of the drier and are set in motion relative to their plane by rotation of the aforesaid mechanism, the paths of the points of contact made by the edges of distributor elements of adjacent planes touching each other or overlapping each other. Other advantageous embodiments of the invention are described hereinafter.

One special advantage of the apparatus according to the invention is the increased reliability in operation. The distributor elements exert an additional grinding action on the material being dried, thereby completely preventing the formation of lumps. The liquid products can be uniformly distributed over the exchange surfaces without the formation of incrustations to any significant extent and without blockage of the apparatus and hence with full utilisation of these surfaces. The apparatus is sufficiently flexible that the size and the material of the distributor elements and the number of planes can be adapted within a wide range to the product which is to be dried.

The driers according to the invention may be used in the chemical industry, for example for the manufacture of dyes and pigments, and in the pharmaceutical and photochemical industry and for the treatment of effluent. The dimensions which are relevant to the process, such as the thickness of the film, the rate of throughput and the output capacity, must be determined in advance by preliminary tests.

The distributor elements produce vigorous turbulence in the film on the internal surface of the body. The centrifugal force with which the distributor elements press the film of liquid against the internal surface displaces a layer of bubbles so that a relatively high wall temperature is generally permissible. The apparatus according to the invention may in principle be employed for vacuum drying.

BRIEF DESCRIPTION OF THE DRAWINGS

The invention is illustrated in the drawing and described in more detail below. In the drawing:
 FIG. 1 is a longitudinal section through a drier,
 FIG. 2 a top plan view, and
 FIG. 3 a section taken parallel to a partition.

DETAILED DESCRIPTION OF THE INVENTION

Figure 2:
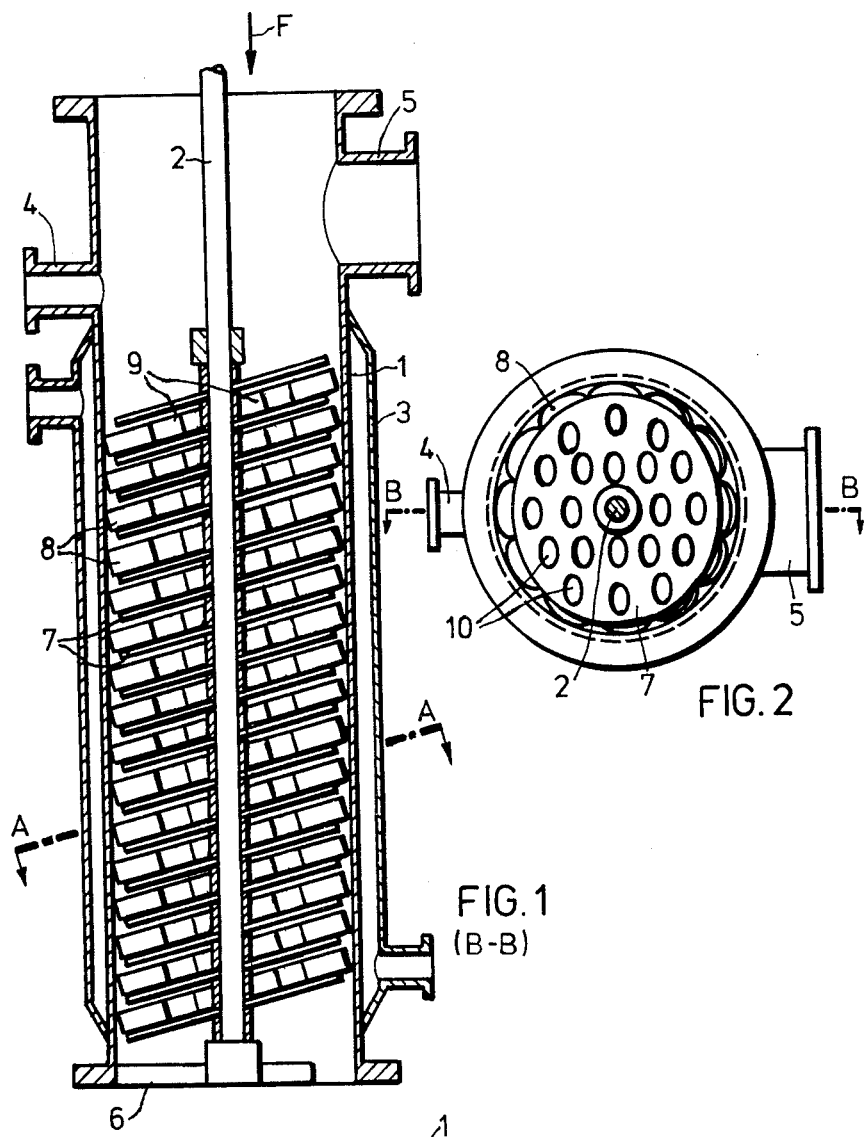

The drier substantially comprises a vertical cylindrical pipe 1 having an insert rotatable about an axial shaft 2. The pipe 1 is adapted to be heated by a jacket 3. The product which is to be dried is fed into an inlet 4 and the vapours escape through an outlet 5. The dry product is removed at a bottom flange 6. Product distribution ring and drive means are not shown in the drawing. Seventeen circular discs 7 are mounted on the shaft 2. They are all parallel to each other but inclined to and thus discs 7 have a wobbling appearance during rotation the shaft 2. The angle between the normal and the axis is in this example 15°. The distance between the circumference of the disc 7 and the internal surface is not uniform. This does not matter but the size of distributor elements 8 must be adjusted to these gaps. The wobble discs must maintain the distributor elements within the space bounded by two discs, the elements not being guided by any other means.

FIG. 2 is a top plan view of the thin layer contact drier viewed in the direction indicated by the arrow F (FIG. 1). The longitudinal section of FIG. 1 is indicated by B—B. The drawing is a view of the uppermost disc 7 and shows apertures 10 which are provided in each disc. Through these apertures, the product travels downwards inside the drier but they serve particularly as a passage for the vapours travelling upwards.

Parts of the distributor elements 8 are visible in the drawing. These elements partly contact the internal surface of the pipe 1. These distributor elements are cylindrical.

In the drawing, the top edges of the distributor elements touch the internal surfaces of the pipe on the left side and the bottom edges touch the internal surfaces on the right side.

FIG. 3 shows two types of distributor elements 8, 9. This figure is a section A—A taken parallel to a disc 7.

FIG. 3 shows the distributor elements 8,9 evenly arranged but in practice this orderly state does not prevail, nor is it necessary to adjust the number and diameter of the distributor elements 8 to the internal diameter of the cylindrical pipe 1 in such a manner that all the elements 8 will always touch each other. The only condition that need be fulfilled is that at a given inclination of the disc 7, the height of the distributor elements should be chosen so that the bottom edge of a distributor element which is situated at the highest point on the disc should be higher than the top edge of a distributor element which is situated at the lowest point of the disc above the first mentioned disc. This ensures that every point on the internal wall in the region of the insert will be swept by distributor elements and stripped by them. The diameter of the distributor elements must at least be large enough to ensure that the elements cannot slip through the gaps which are inevitably formed with the internal wall of the pipe due to the inclination of the circular discs.

EXAMPLE

A dispersion of "Disperse Red 60" is dried in the drier according to the invention under the following conditions:

Initial moisture content 85%, temperature of heating medium 130° C. Drying proceeds without difficulty and a finely pulverulent, homogeneous dry product having a residual moisture content of 1.5% is continuously delivered for many hours.

When the same dispersion is dried in a commercial thin layer contact drier with pendulating elements, initial moisture content 85%, temperature of heating medium 130° C., the dried product contains moist lumps and the cross-section of the drier is partially blocked. The rotor shaft and the pendulating elements are heavily covered with moist product and the rotor jams after a few hours.

What is claimed is:

1. Apparatus for drying solutions, dispersions or suspensions comprising an elongated drying chamber, a heating jacket therearound for heating the internal surface of the chamber, a feed device, a discharge device for dried product and a vapour outlet, and rotatable means in the chamber comprising an axially disposed rotatable shaft, at least one annular set of distributor elements and means mounting the distributor elements between several parallel planes for permitting free movement between these planes in the annular space between the shaft and the internal surface of the chamber and for permitting vertical travel of the product to be dried from plane to plane, wherein the planes are non-perpendicular to the axial shaft and the outermost set of distributor elements at least partly touch the internal surface of the chamber and all of the distributor elements are set into motion both vertically and angularly relative to the internal surface of the chamber in response to the rotation of the shaft such that the paths of the points of contact of the edges of the distributor elements of adjacent planes touching or overlapping each other, whereby the free movement of the distributing elements and the vertical travel of the product permitted by said mounting means effects a secondary effect of preventing formation of lumps during drying.

2. Apparatus according to claim 1, wherein the internal surface of the chamber is cylindrical.

3. Apparatus according to claim 1 or claim 2, wherein the drying chamber is a vertically disposed cylindrical pipe.

4. Apparatus according to claim 1, wherein the mounting means further comprises apertured partitions fixed to the axial shaft, wherein the partitions are parallel to each other and non-perpendicular to the shaft.

5. Apparatus according to claim 4, wherein the angle between the normal to the partitions and the axis of the shaft is up to 45°.

6. Apparatus according to claim 5, wherein the angle is from 5° to 25°.

7. Apparatus according to claim 5, wherein the distributor elements are approximately cyclically symmetrical about an axis which is parallel to the perpendicular to the planes.

8. Apparatus according to claim 7, wherein the distributor elements are cylindrical.

9. Apparatus according to claim 6 or claim 8 wherein the height of the distributor elements is approximately 1 mm less than the distance between two partitions.

10. Apparatus according to claim 1, wherein the distances between the planes differ from each other.

11. Apparatus according to claim 1, wherein at least two annular sets of differing distributor elements are combined between two planes.

* * * * *